United States Patent [19]

Manniso

[11] Patent Number: 4,865,909
[45] Date of Patent: Sep. 12, 1989

[54] MICROPOROUS ANTI-FOULING MARINE COATING

[75] Inventor: James L. Manniso, Newark, Del.

[73] Assignee: W. L. Gore & Associates, Inc., Newark, Del.

[21] Appl. No.: 111,960

[22] Filed: Oct. 21, 1987

[51] Int. Cl.⁴ .............................................. B32B 7/00
[52] U.S. Cl. ........................................ 428/251; 422/6;
428/252; 428/280; 428/285; 428/286; 428/287;
428/315.5; 428/315.7; 428/315.9
[58] Field of Search ................... 428/251, 252, 315.5,
428/315.7, 315.9, 907, 280, 285, 286, 287; 422/6

[56] References Cited

U.S. PATENT DOCUMENTS

| | | | |
|---|---|---|---|
| 4,552,813 | 11/1985 | Grams | 428/907 |
| 4,576,838 | 3/1986 | Rosen | 428/907 |
| 4,596,724 | 6/1986 | Lane | 428/907 |
| 4,599,368 | 7/1986 | Kimmel | 428/907 |

Primary Examiner—Marion C. McCamish
Attorney, Agent, or Firm—Gary A. Samuels

[57] ABSTRACT

An anti-fouling marine coating comprising a hydrophobic porous polymeric membrane adhered to a surface by a marine paint containing a biological toxicant. An organism attaches, penetrates pores, releases the toxicant, weakens or dies, is swept away by water action. Biologically triggered toxicant release, no leaching into the sea, porous expanded polytetrafluoroethylene membrane preferred.

17 Claims, 3 Drawing Sheets

MICROPOROUS ANTI-FOULING MARINE COATING

FIELD OF THE INVENTION

This invention pertains to anti-fouling marine coatings for use on underwater marine structures, such as ship hulls, offshore floating or emplaced marine drilling platforms, submergence vehicles, navigational aids, or any underwater structural surfaces where marine biofouling may be a problem.

BACKGROUND OF THE INVENTION

Ever since man has utilized ships upon the sea, one of the outstanding problems has been biological fouling of the underwater surfaces. Numerous methods and substances for coating the underwater portions of ship's hulls against such fouling have been utilized with variable success. Marine organisms, such as slimes and barnacles, despite modern coatings technology, have found ways to become attached to coatings in an unacceptable manner. Present technology can generally be classified into one of two methods: methods that prevent the attachment of the organisms by toxic leaching coatings, which over time slowly leach a material toxic to adhering marine organisms; and fouling release coatings, which to some degree are anti-adhesive to marine organisms, being manufactured from polymers which the organisms find it relatively more difficult to adhere to, such as fluorinated or silicone polymers, or coatings containing polytetrafluoroethylene powder as pigment. The latter coatings and methods have been extensively investigated by Griffith, Bultman, O'Rear, Field, and coworkers at the Naval Research Laboratories and reported in the literature and in a number of U.S. Pat. Nos., e.g. NRL report 7127 (Aug. 1970); Polym. Prep., Am. Chem. Soc., Div. Polym. Chem. 14 (2), 1148-53 (1973); Ind. Eng. Chem. Prod. Res. Dev., Vol. 17, No. 1 p. 8-9, 1978; Polymer, May 1985 p. 27; Naval Engineers J., p. 129-132, April 1980., Ind. Eng. Chem. Prod. Res. Dev. 1986, 25, 572-7; U.S. Pat. Nos. 4,157,358, 4,045,408, 3,720,639, 4,132,681, 4,284,747, 3,872,045, 4,633,023, 3,852,222, 4,452,998, 3,549,591, and 3,879,430.

The toxic leaching method maintains a fairly clean underwater surface effectively for approximately one year, after which time the coating containing the toxicant must be removed and replaced, having been overgrown by marine organisms and depleted of its toxicant. Even if few organisms had been growing on its surface, the toxicant therein would still have been leaching out into the sea, thus adding over the long term to the pollution thereof.

The anti-adhesive or fouling release coating provides a surface inherently difficult for an organism to bond to by virtue of its chemical composition or physical surface characteristics or a combination of both. The fluorinated epoxy polymer and silicone surfaces described by Griffith, and others, such as exemplified by U.S. Pat. Nos. 4,157,358, 4,045,408, 3,720,639, 4,132,681, 4,284,747, 3,872,045, 3,852,222, 3,549,591, and 3,879,430, are of this type and yield surfaces which are not immune to biological growth, but growth which can be removed from the surfaces by the force of water sprays or by high pressure water washes in combination with hand or machine wiping or brushing.

BRIEF DESCRIPTION OF THE INVENTION

The present invention relates to anti-fouling marine coatings which operate by a hydrophobically controlled release of biologically toxic substances impregnated into a microporous low surface energy polymeric membrane which is imbedded in a marine coating containing the toxic substances. The micoporous polymeric membrane is adhered to, for example, a ship's hull by a coating of marine paint containing at least one of the biological toxicants known in the art to be suitable against marine growth, such as slimes or barnacles The paint coats the hull against corrosion and may contain anti-corrosion materials as well as biological toxicants or may optionally be applied over a coating of anti-corrosion paint as the first layer on the metal of the hull. The paint partially soaks into the microporous membrane as it causes its adherance to the paint layer.

Ordinarily, with no biological growth or marine organism present on it, the microporous membrane is hydrophobic to sea water and the pores are small enough so that no water enters the membrane to contact the toxicant at any depth at which the coating is used, and no toxicant is leached out into the sea to thereby pollute it. When a slime or barnacle organism attaches to the surface of the membrane, however, it is able to penetrate the pores of the membrane by defeating the hydrophobicity of the membrane or by directly penetrating the pores of the membrane and it contacts the toxicant in the paint which has partially filled the pores. The toxicant is then released only into the organism directly and the organism withdraws, is killed, or weakened and washed off the membrane and the membrane at that point is again hydrophobic to sea water and no toxicant is being released. The present invention can thus be said to be marine organism-triggered.

DETAILED DESCRIPTION OF THE PREFERRED EMBODIMENTS

Figure 1:
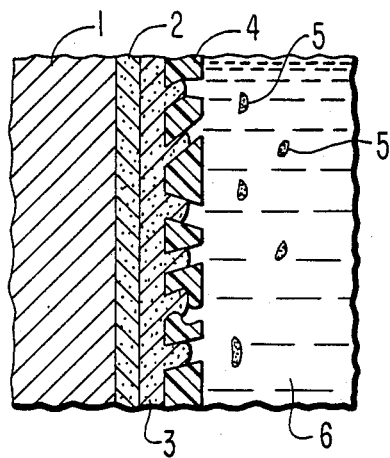
FIG. 1 shows a partial cross-section of ship's hull depicting the layers therein before attack or adherence of a marine organism.

The anti-fouling marine coating of present invention is now described with reference to the drawings. In FIG. 1, a section through the thickness of a ship's hull 1 is shown, for example, with an optional coating 2 of a standard anti-corrosion marine paint applied first to the bare metal surface to protect the metal of the hull against the many forms of chemical corrosion provided by the environment of sea water and weather which it must withstand. Pigments known to inhibit metallic corrosion are used in this paint, such as red lead oxide, basic blue lead sulfate, lead, zinc, and strontium chromate salts. On top of coating 2 or in place of it is next applied anti-fouling paint 3 which contains the biological toxicant, such as mercurous or cuprous oxide, mercurous chloride, copper linoleate, a tributyltin compound, or 2,3-dichloro-1,4-naphthoquinone.

Figure 3:
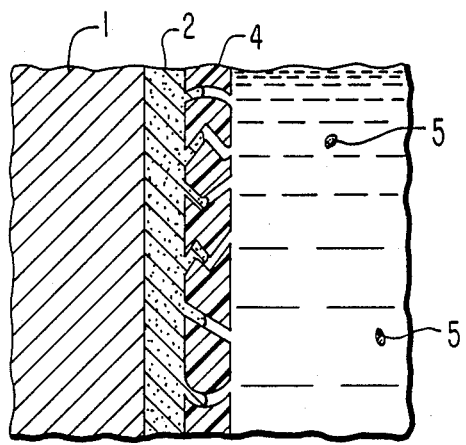
FIG. 3 describes the alternative wherein wet anti-corrosion paint anchors membrane pre-impregnated with biological toxicant to the hull.

While paint layer 3 is still wet or in a newly applied wet layer of paint 3 separately or newly applied for the purpose, the layer of microporous polymeric membrane 4 is laid down on and partially imbedded in layer 3. Overlapping edges of membrane 4 may be adhered by a coating of paint 3 between the two layers. The biological toxicant may alternatively be pre-impregnated into membrane 4 instead of being contained in paint layer 3, or as shown in FIG. 3, paint layer 3 may be omitted altogether, and the toxicant pre-impregnated membrane adhered to the ship's hull by being partially imbedded in the wet layer of corrosion resistant paint 2 before it has dried.

Figure 4:
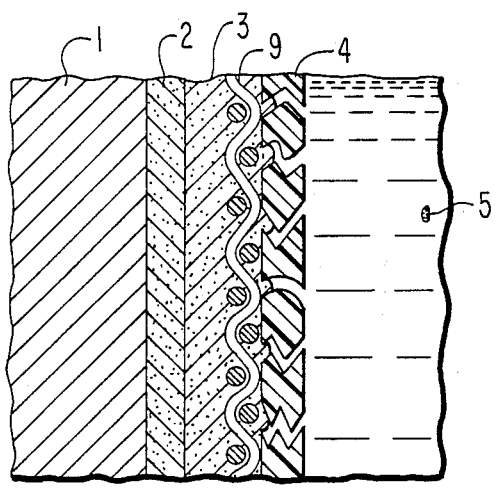
FIG. 4 shows a membrane laminate with a textile fabric adhered to the anti-corrosion paint layer with a wet layer of paint containing biological toxicant.
Figure 5:
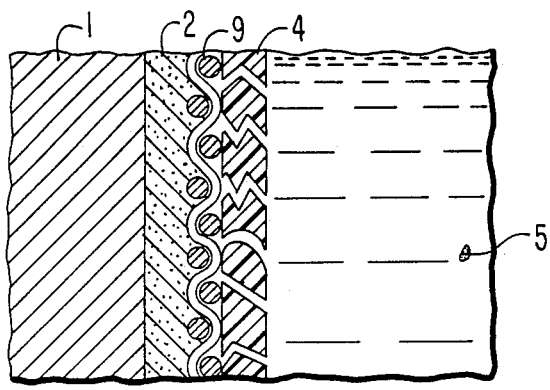
FIG. 5 describes use of a textile membrane laminate pre-impregnated with biological toxicant and adhered to the hull by wet anti-corrosion paint.
Figure 6:
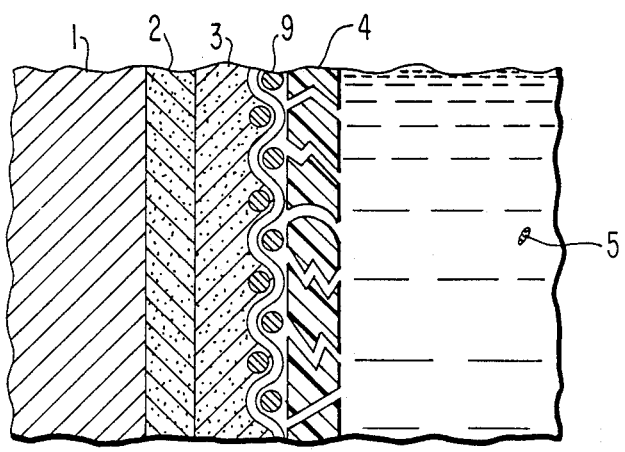
FIG. 6 also shows use of pre-impregnated laminate, but bonding to a hull by a separate layer of paint than the initial anti-corrosion paint.

In place of microporous polymeric membrane 4 may be used laminates of membrane 4 with polyester or polypropylene woven or nonwoven fabrics or felts. Such textile 9 and membrane 4 layers may be adhesively or heat bonded to each other and the laminates formed thereby may be pre-impregnated with a biological toxicant to marine organisms and partially imbedded in marine paint or a non-impregnated laminate may be imbedded partially in wet toxicant-containing marine paint. FIGS. 4, 5, and 6 illustrate these alternative methods of utilization of the unique properties of these membranes and laminates.

Figure 2:
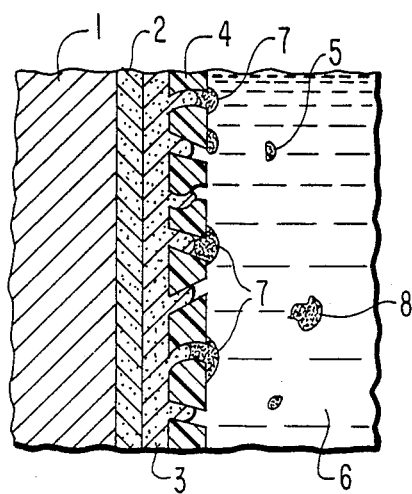
FIG. 2 is the same partial cross-section of ship's hull under attack by several organisms.

Any microporous organic polymeric membrane may be used which has adequate porosity to adhere to and partially soak up the toxic marine paint being used and enough hydrophobicity to repel sea water 6 from its surface and pores at the depths this coating is being utilized, such that the biological toxicant contained in the paint is not leached into the sea by the sea water alone. Only the organism 7 which penetrates the membrane and its pores as in FIG. 2 to trigger release of the toxicant, does so, dies, and falls from the surface releases any toxicant. The surface reverts to its former hydrophobicity and sea water-repellant character after departure of the organism 8 or 5. The preferred organic polymeric membrane material for utilization in the present invention is the porous expanded polytetrafluoroethylene (EPTFE) disclosed in U.S. Pat. Nos. 3,953,566, 3,962,153, 4,096,227, 4,110,392, and 4,187,390. The materials described therein are extremely hydrophobic to sea water, may be controllably stretched to yield membrane of any desired pore size, and have a low friction surface which may provide a more efficient passage of a surface covered with the membrane through sea water. Although the above materials are preferable for membranes, other known polymeric membranes of appropriate porosity and hydrophobic properties may be used in the invention, such as porous polypropylene or porous fluorinated polymers other then EPTFE. It is essential that adequate hydrophobic character be present in the membrane in conjunction with microporosity to render the toxicant lodged within the pores of the membrane releasable only by or triggered by the marine organisms against which the coating is intended. Ocean water does not wet low energy surfaces such as EPTFE and the pore size is selected so that water entry pressure is not exceeded for any depth at which the coating is to be used. The biological toxicants in paint 3 are water activated, but since water does not penetrate the pores, no activation occurs since there is no leaching into the sea. When a marine organism such as a slime or a barnacle attempts to fasten itself to the surface, it changes the surface energy of the surface, and the sea water or fluids of the organism wet the surface of the membrane and pores, and reach the toxicant lodged therein and contact with toxicant directly. The released toxicant poisons the organism, the organism is released from the surface such as by sea turbulence, and hydrophobicity is restored to the surface.

Thus the advantages of the invention can be seen to be the following. Bio-toxicants are released into fouling organisms and not leached into sea water over time by the membrane skin of preferably EPTFE, which keeps out sea water by its hydrophobicity while at the same time keeping a toxicant to fouling organisms available to contact such organisms as may lodge on the surface and penetrate the porosity to reach it while trying to attach themselves to the surface. Organisms imbibing the toxicant are weakened or killed and easily dislodged from the low-energy surface of EPTFE by the movement of sea water or the ship bearing the coating. Additionally, reduction of the hull drag through the water by application of a low-friction surface of EPTFE should be economically favorable. Also, since only that toxicant used is that absorbed by organisms, the supply of toxicant should have a prolonged life within the pores of the membrane and less toxicant might be used. Also, less anti-fouling paint may be used if the membrane protects it from erosion by the usual causes of corrosion, sea action, and organism attack and displacement.

It will be obvious to those skilled in the art that other modifications and variations of the invention may to be used without departing from the scope of the invention which is described by the appended claims.

I claim:

1. An anti-fouling coated marine substrate comprising:
   (a) a solid marine substrate material coated with
   (b) an adherent first layer of anti-fouling corrosion-resisting marine paint containing a toxicant to marine organisms and
   (c) a second layer of a microporous low surface energy organic polymeric membrane adhered to said first paint layer.

2. A coated substrate of claim 1, wherein said second layer is partially imbedded in said first layer and the interstices of said second layer are partially filled with said first layer.

3. A coated substrate of claim 2, wherein said second layer comprises porous polytetrafluroethylene.

4. A coated substrate of claim 2 or 3, wherein the average pore size of said membrane is that necessary to render said membrane a hydrophobic barrier to sea water.

5. A anti-fouling coated marine substrate comprising:
   (a) a solid marine substrate material coated with
   (b) a layer of anti-fouling corrosion-resistant marine paint containing a toxicant to marine organisms, and
   (c) a layer of microporous low surface energy organic polymeric membrane laminated to a textile layer, said layer laminate adhered to said first layer.

6. A coated substrate of claim 5, wherein said layer is partially imbedded in said layer and the interstices of said layer are partially filled with said layer, said textile layer of said laminate being adjacent to said layer.

7. A coated substrate of claim 6, wherein said textile layer is woven, non-woven, or felted.

8. A coated substrate of claim 7, wherein said textile layer is polypropylene or polyester.

9. A coated membrane of claim 8, wherein said membrane is porous polytetrafluoroethylene.

10. An anti-fouling coated marine substrate comprising:
   (a) a solid marine substrate material coated with
   (b) a second layer of anti-fouling corrosion-resistant marine paint and
   (c) a third layer of microporous low surface energy organic polymeric membrane which has been pre-impregnated with a toxicant to marine organisms and is adhered to said second layer.

11. A coated marine substrate of claim 10 wherein said third layer is partially imbedded in said second layer and the interstices of said third layer are partially filled with said second layer.

12. A substrate of claim 11, wherein said third layer is porous polytetrafluoroethylene.

13. A process for protecting a marine substrate from living organisms comprising the steps of:
   (a) coating said substrate with an anti-fouling corrosion-resistant marine paint containing a toxicant to marine organisms and
   (b) adhering to said paint a layer of microporous low surface energy organic polymeric membrane.

14. A process of claim 13 wherein said membrane adhered to said paint layer has an average pore size necessary to render said membrane hydrophylic to sea water.

15. A process for protecting a marine substrate from living organisms comprising the steps of:
   (a) coating said substrate with an anti-fouling corrosion-resistant marine paint containing a toxicant to marine organisms and
   (b) adhering to said marine paint layer a layer of microporous low surface energy organic polymeric membrane laminated to a textile layer, said textile layer being adjacent to said paint layer.

16. A process of claim 15 wherein said polymeric membrane is porous polytetrafluoroethylene and said textile layer is polypropylene or polyester.

17. A process of claim 16 wherein the textile layer is woven, non-woven or felted.

* * * * *